(12) United States Patent
Aamodt

(10) Patent No.: US 7,482,094 B2
(45) Date of Patent: Jan. 27, 2009

(54) SPACER SEPARATOR SUBASSEMBLY

(75) Inventor: Paul B. Aamodt, Richfield, MN (US)

(73) Assignee: Medtronic, Inc., Minneapolis, MN (US)

( * ) Notice: Subject to any disclaimer, the term of this patent is extended or adjusted under 35 U.S.C. 154(b) by 662 days.

(21) Appl. No.: 10/661,666

(22) Filed: Sep. 12, 2003

(65) Prior Publication Data

US 2005/0058895 A1    Mar. 17, 2005

(51) Int. Cl.
*H01M 2/18* (2006.01)
(52) U.S. Cl. .................. 429/136; 429/129; 429/130; 429/131; 429/133
(58) Field of Classification Search .............. 429/131
See application file for complete search history.

(56) References Cited

U.S. PATENT DOCUMENTS

| 5,458,997 | A | 10/1995 | Crespi et al. ............ 429/219 |
| 5,486,215 | A | 1/1996 | Kelm et al. ............ 29/623.1 |
| 5,591,544 | A | 1/1997 | Fauteux et al. ............ 429/209 |
| 5,631,102 | A | 5/1997 | Spillman et al. ............ 429/94 |
| 6,051,038 | A | 4/2000 | Howard et al. ............ 29/623.1 |
| 6,110,622 | A | 8/2000 | Frysz et al. ............ 429/233 |
| 2004/0064163 | A1 | 4/2004 | Aamodt et al. ............ 607/36 |

*Primary Examiner*—Patrick Ryan
*Assistant Examiner*—Cynthia Lee
(74) *Attorney, Agent, or Firm*—Carol F. Barry

(57) ABSTRACT

The separator subassembly includes a spacer layer formed from a film of microporous, non-conductive material joined to a separator by a heating process, wherein the separator is formed from an elongated piece of microporous, non-conductive film. When an anode subassembly is enveloped within the separator subassembly, the spacer aligns with a surface-mounted anode current collector of the alkali metal anode. The spacer serves as an additional protective layer between the cathode material and the anode current collector as the anode depletes.

20 Claims, 7 Drawing Sheets

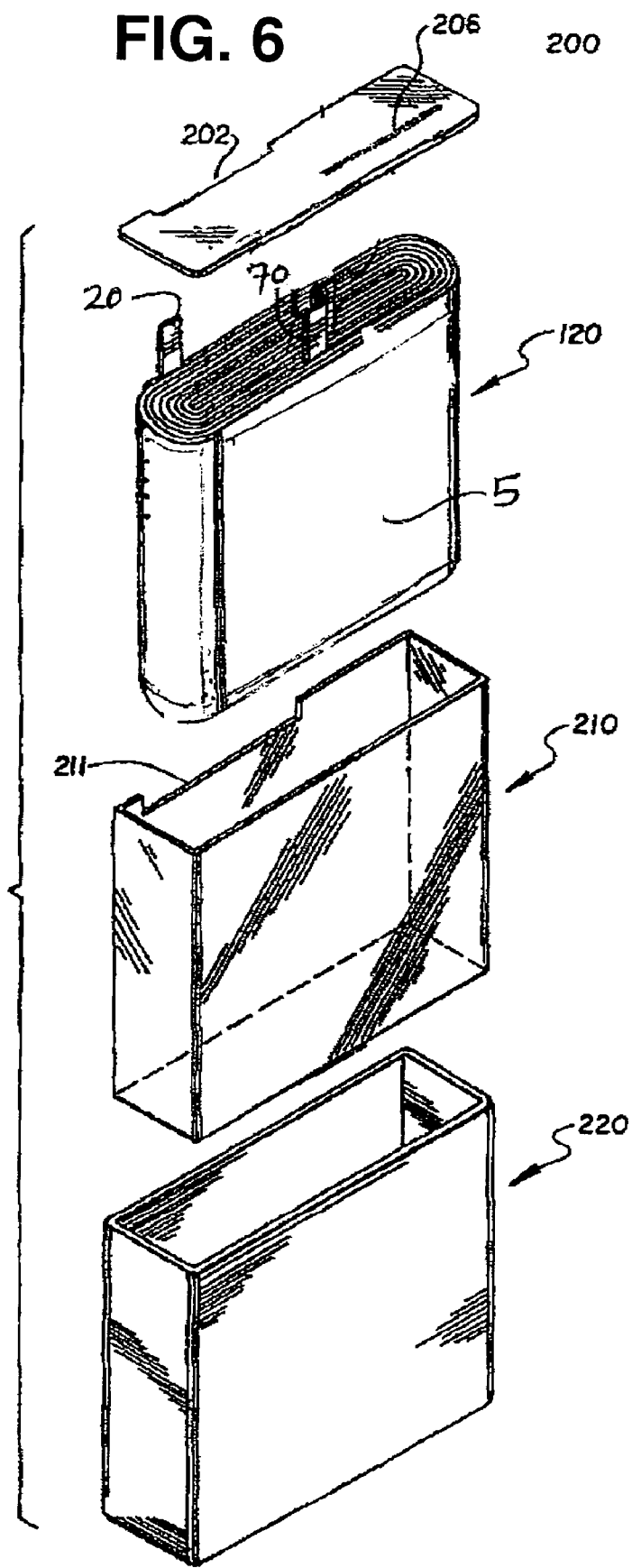

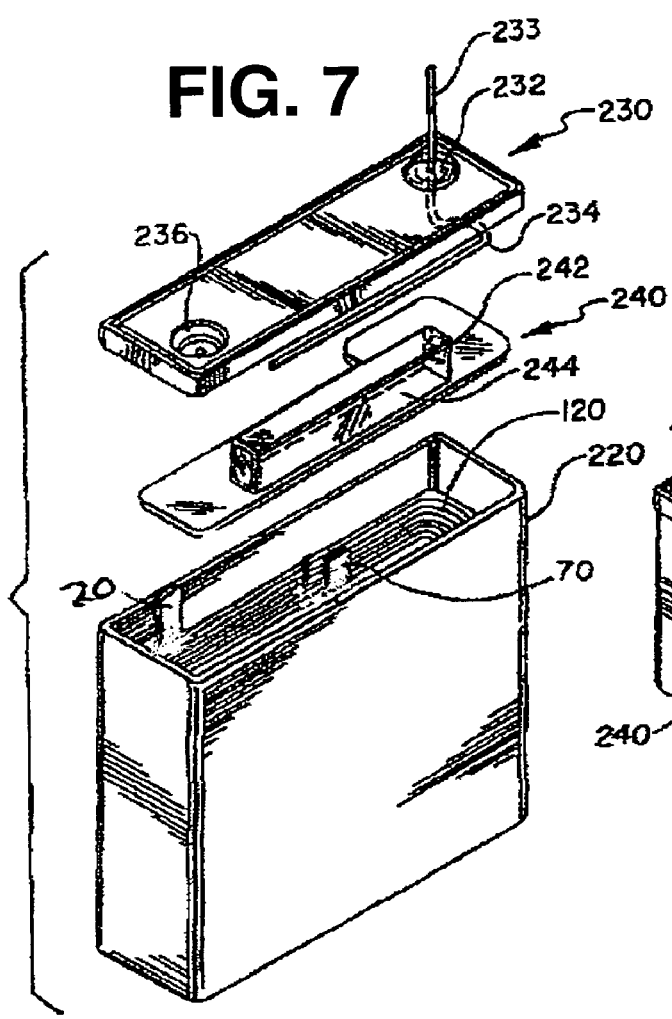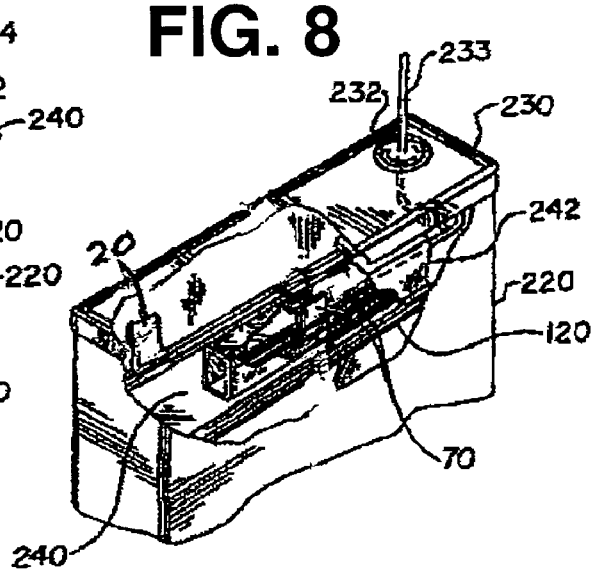

SPACER SEPARATOR SUBASSEMBLY

CROSS-REFERENCE TO RELATED PATENT APPLICATIONS

This application cross-references two co-pending non-provisional U.S. patent applications filed on even date herewith; namely, application Ser. No. 10/661,920 entitled, "Lithium-Limited Anode Subassembly with Solid Anode Current Collector and Spacer" and application Ser. No. 10/661,909 entitled, "Lithium-Limited Anode Assembly" the contents of both are hereby incorporated by reference.

FIELD OF THE INVENTION

The present invention relates to the field of implantable electrochemical cells. More particularly, the present invention relates to a separator subassembly having a spacer for providing a protective layer between an anode subassembly and a cathode subassembly in an implantable electrochemical cell.

BACKGROUND OF THE INVENTION

Implantable cardiac stimulation devices, such as defibrillators and pacemakers, are used to treat patients suffering from cardiac arrhythmias or other cardiac dysfunction. In operation, such devices may continuously monitor the electrical activity of the heart and deliver appropriate stimulation therapies to normalize electrical or mechanical dysfunction. Cardiac stimulation devices must possess low self-discharge in order to have a useful life of many months, and must be highly reliable to provide a needed therapy whenever necessary. In implantable defibrillators, the power source must have a high rate capability to provide the necessary charge to the capacitors for delivering high-energy shocks. In addition, since cardiac stimulation devices are implanted, the battery must be able to supply energy from a minimum packaged volume.

Batteries or electrochemical cells are volumetrically constrained systems. The size or volume of components that go into a battery (cathode, anode, separator, current collectors, electrolyte, etc.) cannot exceed the available volume of the battery case. In addition, the appropriate amount of some components depends on the amount of other components that are used. These components must be "balanced" to provide discharge to the extent desired.

In a conventional cathode limited battery such as a lithium-silver vanadium oxide (LiSVO) battery commonly used in cardiac stimulation devices, the capacity ($Q_+$) of the cathode must not exceed the capacity ($Q_-$) of the anode. Cathode limited cells have been used in battery powered implantable medical devices such as heart pacemakers because of the proven reliability of their discharge over the long periods during which they are implanted. The volume occupied by the other battery components also depends on the cathode capacity ($Q_+$) as reflected by the amount of cathode material in the battery. The amount of electrolyte depends on the amount of cathode material and the amount of it to be discharged since the cathode material swells as the battery is discharged and requires more electrolyte to fill the additional cathode volume. The volume of the separator and current collector depends on the area of the electrodes. The area of the electrodes depends on the area required for consistent pulse output as the battery is discharged. All of these components must be adjusted for a given battery volume.

One method for constructing a lithium anode cell is to wind cathode and anode elements together to form a cylindrical or oblong coil. In a coiled design, anode material is available on either side of the cathode windings and will deplete into the cathode as the battery is discharged. Reliable performance is assured by having an excess of anode capacity beyond the usable capacity desired of the cathode. This excess lithium is distributed through the length of the anode. The lithium winding forming the outermost winding of the coil has cathode material adjacent to its inner circumference but not on the outer circumference. Therefore the outermost winding of the anode need only be half the thickness of the inner windings. If an anode is constructed from a single piece of foil that is of uniform thickness, there is an additional excess of lithium on the outermost winding of the coil.

One disadvantage of a cathode-limited cell is that the excess lithium in the cell may reduce other materials after the cathode is fully discharged, which can lead to cell swelling. In order to prevent damage to circuitry within the implantable device surrounding the cell due to cell swelling, a reinforcing stainless steel plate may be provided against the cell. This stainless steel plate occupies valuable space in an implantable device and adds weight to the overall device. In regard to implantable medical devices, a reduced size and weight is desirable to ease the implant procedure and avoid patient discomfort at the implant site. Eliminating the excess lithium or the need for the stainless steel plate would allow the cell size, and therefore the overall size of the medical device, to be reduced. Alternatively, the volume occupied by excess lithium and the steel plate could otherwise be taken up by cathode material to increase the battery capacity.

Another disadvantage of a cathode-limited cell is that its resistance increases as a function of time after the cell is discharged to the second voltage plateau on its discharge curve. By limiting the amount of lithium and electrolyte material in the cell, the cell may be designed to utilize only the first voltage plateau. Superior long-term cell performance can be achieved since the same useful capacity can be provided as in a conventionally balanced cell but at a higher voltage toward the end of the discharge cycle. A lithium-limited balanced cell having these advantages is disclosed in U.S. Pat. No. 5,458,997 to Crespi et al, incorporated herein by reference in its entirety.

In a coiled, anode-limited cell it is desirable to reduce the excess anode material present in the outermost winding that does not interface cathode material on both sides. One method for manufacturing an anode-limited cell that eliminates the excess anode material involves layering two lithium foil pieces. One lithium foil is provided long enough to form all of the windings in a coil, and the other lithium foil is provided long enough to form only the inner windings. When the two foils are overlaid and coiled with a cathode, the inner coil windings are formed by a double layer of lithium foil and the outermost winding by a single layer of lithium foil.

Another method for reducing excess lithium in an anode-limited cell is disclosed in commonly assigned U.S. patent application Ser. No. 10/123,495 filed 15 Apr. 2002 and entitled, "Balanced Anode Electrode" invented by Aamodt et al., the contents of which are hereby incorporated by reference. The disclosed method utilizes a short, thin lithium foil joined to a long, thick lithium foil such that the shorter, thinner foil will form the outermost coil winding and the longer thicker foil will form all of the inner windings. This method advantageously provides a narrow tolerance of the anode material for fully gaining the benefits of an anode-limited cell.

The anode current collector is commonly provided as a perforated conductive material such as a nickel or titanium grid. During assembly, the anode current collector is pressed against the anode material such that the anode material becomes enmeshed with the openings in the anode current collector. In this way, the openings in the anode current collector grid act to strengthen the mechanical joint between the current collector and the anode material and prevent separation of these components. The anode current collector further acts to provide reinforcement to the thin lithium layer in the outermost winding.

A limitation exists, however, in coiled, anode-limited cells of this type relating to the potential for a short between the cathode material and the anode current collector. When the thin layer of lithium has substantially depleted into the cathode in the outermost winding, the cathode may press into the anode current collector potentially causing a short.

The anode current collector may extend the length of the coil windings or be positioned only on the outermost coil winding. The inventors of the present invention have discovered that, when the anode material becomes depleted toward the end of cell discharge, the cathode material may press against the anode current collector. Cracks that naturally occur in the cathode material create exposed edges of the cathode material that can press against the edges of the perforations or holes in the anode current collector grid, particularly in the final turn of the outermost winding of a coiled electrode assembly. Even if a separator material is present between the cathode and anode subassemblies, the separator material may tear when pressed between a cathode crack edge and an anode current collector edge. The possibility exists, therefore, for a short to occur between the cathode material and anode current collector causing the battery to fail unexpectedly.

Though this failure mechanism is expected to be highly infrequent, it could result in potentially serious consequences for a patient having an implanted device. Thus, an improved electrode assembly is needed which overcomes the potential failure mechanism described above, particularly in anode-limited cells but potentially in any cell in which cathode cracking may precipitate a short between the cathode and anode.

BRIEF SUMMARY OF THE INVENTION

The present invention addresses the limitations described above by providing an electrode assembly for use in an implantable electrochemical cell having a separator subassembly formed from a separator and a spacer joined to the separator. The electrode assembly includes an anode subassembly, enveloped within the separator subassembly, and a cathode subassembly. The anode subassembly includes an anode current collector pressed against an alkali metal anode to form a secure attachment between the anode current collector and alkali metal anode. The separator subassembly includes a separator formed from an elongated piece of microporous, non-conductive film, which is inert in the environment of the electrochemical cell, such as a polypropylene or polyethylene film. A spacer, also formed from a film of microporous, non-conductive material, is joined to the separator by a heating process.

The separator is dimensioned so as to envelope the anode subassembly. The spacer is joined to the separator at a location that will result in the alignment of the spacer and the anode current collector. The spacer may be positioned on an outer face of the separator subassembly or on an inner face of the separator subassembly.

The cathode subassembly includes a cathode current collector and cathode material. The anode and cathode subassemblies may be wound, folded or wrapped around an appropriately sized mandrel to form the electrode assembly. In a coiled electrode assembly, the anode current collector is preferably located on the outside of the outermost coil winding and may extend the length of the outermost coil winding and may optionally extend further into the inner coil windings. The spacer included in the separator subassembly extends on the inside of the outermost coil winding such that the spacer opposes the anode current collector on the opposite side of the alkali metal anode. The spacer thereby provides a protective layer between the anode current collector and the cathode material as the anode becomes depleted during battery discharge.

BRIEF DESCRIPTION OF THE DRAWINGS

FIG. 6 is an exploded perspective view showing the insertion of the electrode assembly shown in FIG. 5A in a battery case together with insulator materials.

FIG. 7 is an exploded perspective view showing the application of the insulator and case top to the case and electrode assembly shown in FIG. 6.

FIG. 8 is a partially cut-away perspective view of the completed battery showing the connection of the electrode assembly connector tabs with the case elements.

DETAILED DESCRIPTION OF THE PREFERRED EMBODIMENTS

As described above, the present invention is aimed at providing an improved electrode assembly for an implantable electrochemical cell that is designed to prevent cell failure due to shorting between the cathode material and the anode current collector when the anode becomes depleted during cell discharge. The benefits of the present invention may be realized in anode-limited cells wherein the anode becomes depleted before the cathode. However, it is expected that the benefits of the present invention may also be realized in cathode-limited cells wherein cracks naturally occurring in the cathode material, in particular in relatively thick cathode material, may lead to shorting between the cathode and anode.

While a variety of battery configurations and constructions are possible for anode- or cathode-limited batteries, the methods included in the present invention are particularly suited for batteries having folded, coiled or wrapped electrode configurations, such as the batteries disclosed in U.S. Pat. No. 5,486,215 issued to Kelm et al., and U.S. Pat. No. 6,051,038 issued to Howard et al., both patents incorporated herein by reference in their entirety.

Figure 1:
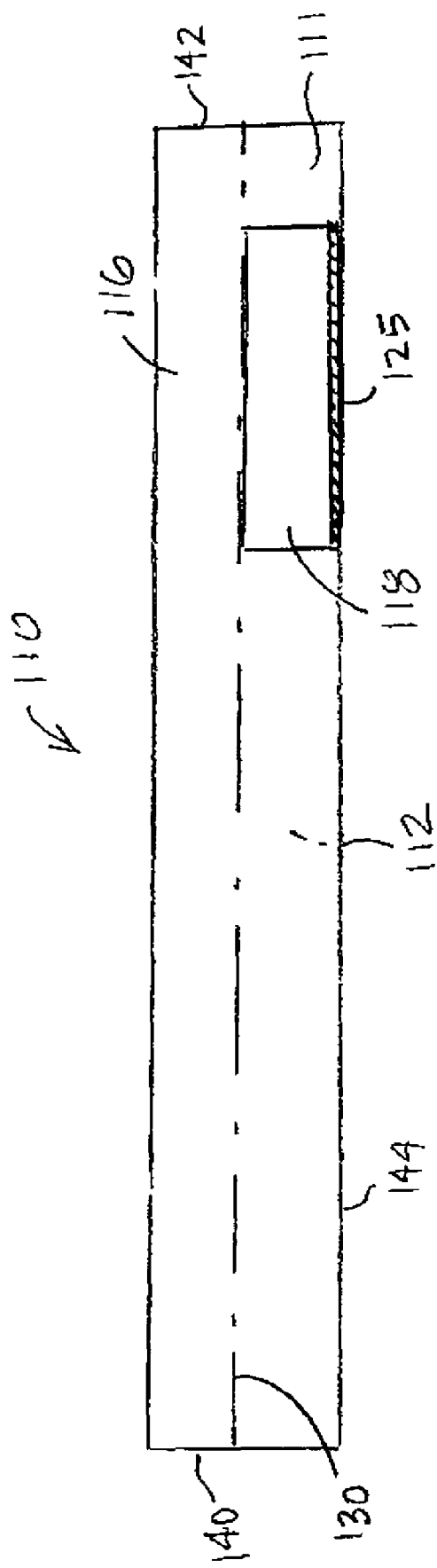
FIG. 1 is a top plan view of a separator subassembly included in an electrode assembly for use in an implantable electrochemical cell according to the present invention.

FIG. 1 is a top plan view of a separator subassembly included in an electrode assembly according to the present invention. Separator subassembly 110 includes a separator 116 and a spacer 118. Separator 116 may be formed from a microporous, single layer or multi-layer film formed from a non-conductive material that is chemically inert in the environment of the electrochemical cell, such as polypropylene and/or polyethylene. In a preferred embodiment, separator 116 is formed as a single layer of polypropylene film about 0.001 inches in thickness. Spacer 118 may also be formed from microporous, single layer or multi-layer film formed from a material such as polypropylene and/or polyethylene, that is compatible for forming a bond or seal with the material used for forming separator 116. Spacer 118 may be formed from a material having greater thickness and/or strength than the material used for forming separator 116. In one embodiment, spacer 118 is formed from a bi-layer film about 0.003 inches in thickness including a microporous layer and a non-woven layer of polypropylene.

Separator 116 is elongated and sized appropriately for enveloping an anode subassembly. Spacer 118 is dimensioned to be slightly larger than an anode current collector included in the anode subassembly. Separator subassembly 110 is formed by joining spacer 118 and separator 116 by applying heat along a desired seam area 125. Seam 125 is shown parallel to longitudinal separator edge 144. Alternatively or additionally, spacer 118 may be sealed to separator 116 along a seam perpendicular to separator edge 144, parallel to separator edge 142. The sealing process may be performed using conventional sealing equipment. In alternative assembly methods, separator 116 and spacer 118 may be joined with the use of high pressure lamination or ultrasonic welding. Separator subassembly 110 is folded longitudinally along its midline 130 such that spacer 118 is located on an inner face 111 of the folded separator subassembly 110. Alternatively, separator subassembly 110 may be folded along longitudinal midline 130 such that spacer 118 is located on an outer face 112 of the folded separator subassembly.

Figure 2A:
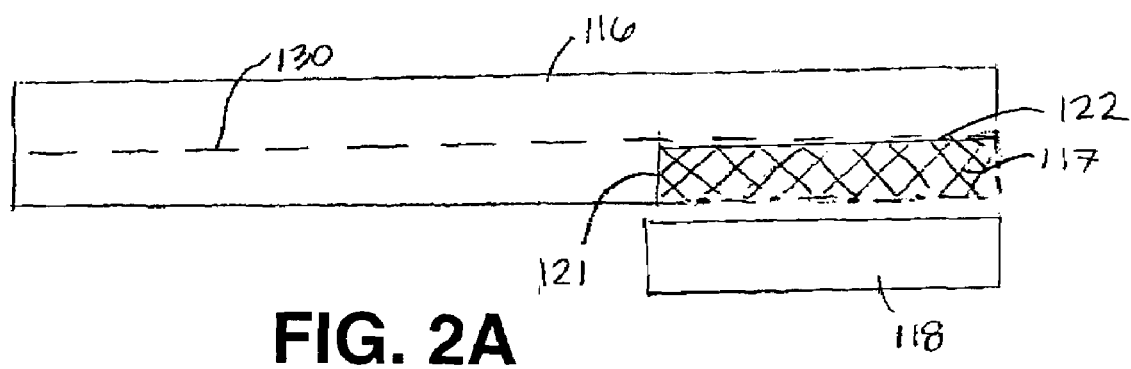
FIG. 2A is an exploded view of an alternative embodiment of a separator subassembly.
Figure 2B:
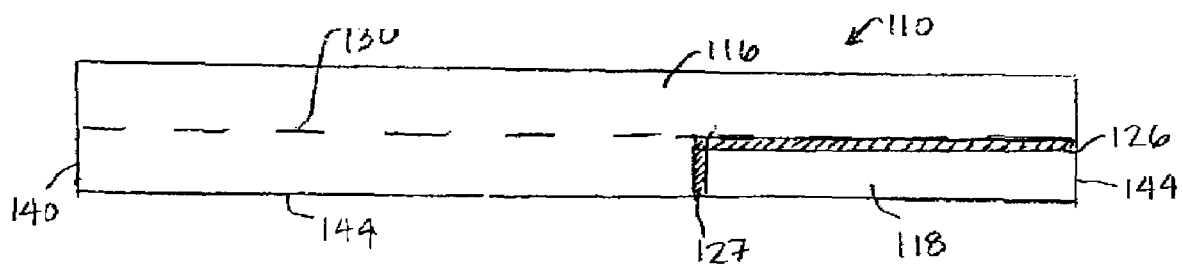
FIG. 2B is a top plan view of the assembled separator subassembly of FIG. 2A.

FIG. 2A is an exploded view of a separator subassembly according to an alternative embodiment of the present invention. In this embodiment, separator 116 is formed by removing a section 117, indicated by the shaded area in FIG. 2A, from an elongated piece of microporous film. Spacer 118 is then sealed to separator 116 along the separator boundaries 121 and 122 formed by removing section 117. As shown in FIG. 2B, spacer 118 is sealed to separator 116 along boundaries 121 and 122 on seams 126 and 127.

Either method for assembling separator subassembly 110, as shown by FIG. 1 or FIGS. 2A and 2B, produces a separator subassembly having an area of one thickness and material strength formed by separator 116 and a second area of a relatively greater thickness and/or material strength formed by spacer 118. Thus, separator subassembly 110 may be advantageously implemented in an electrochemical cell wherein it is desirable to have a relatively stronger protective layer in a particular area. By providing the a thicker spacer material 118 only in the area where the relatively stronger protective area is needed, the total volume occupied by separator subassembly 110 may be minimized while still affording the added protection desired between cell components.

Figure 3:
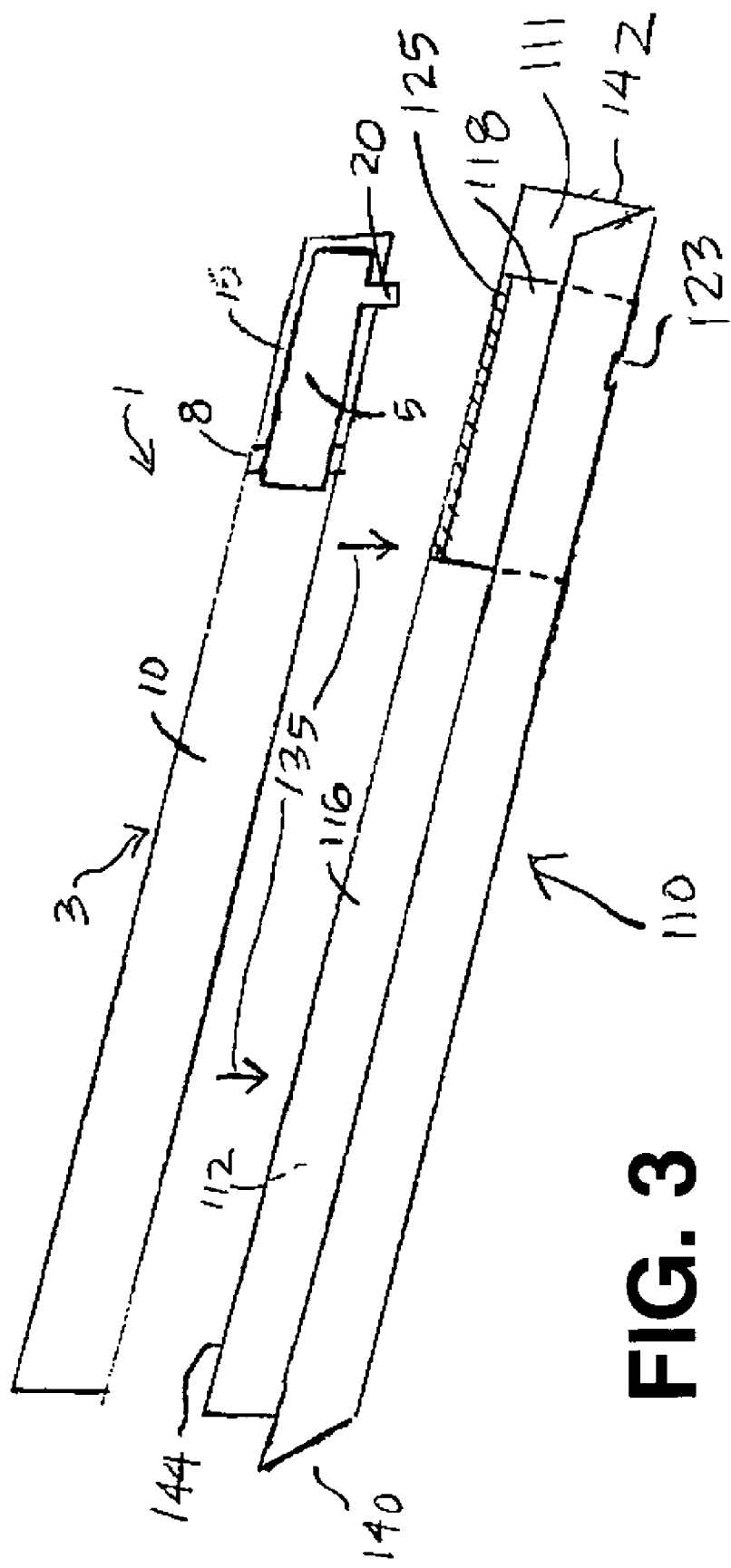
FIG. 3 is a perspective view of a separator subassembly and an anode subassembly, illustrating a method of packaging the anode subassembly within the separator subassembly.

FIG. 3 is a perspective view of separator subassembly 110 and anode subassembly 1 illustrating a method of packaging anode subassembly 1 within separator subassembly 110. Anode subassembly 1 includes an alkali metal anode 3 and an anode current collector 5. As will be described in greater detail below, alkali metal anode 3, in the embodiment shown in FIG. 3, is formed by joining two pieces 10 and 15 of alkali metal.

Anode subassembly 1 is inserted into folded separator subassembly 110 as indicated by arrows 135 in a manner that results in the longitudinal alignment of spacer 118 with solid anode current collector 5. Spacer 118 preferably interfaces with the anode subassembly 1 on the opposite side from anode current collector 5. In other words, the alkali metal anode 3 will be present between the anode current collector 5 and spacer 118. After positioning anode subassembly 1 in separator subassembly 110, separator subassembly 110 may be sealed along the three open edges 140, 142, and 144 by applying heat to a desired seam area along each edge 140, 142 and 144.

Separator subassembly 110 may be sealed closed around anode subassembly 1 using conventional heat sealing equipment. A slit 123 is provided in separator subassembly 110 to accommodate anode connector tab 20 that allows anode connection to a desired battery terminal.

Figure 4A:
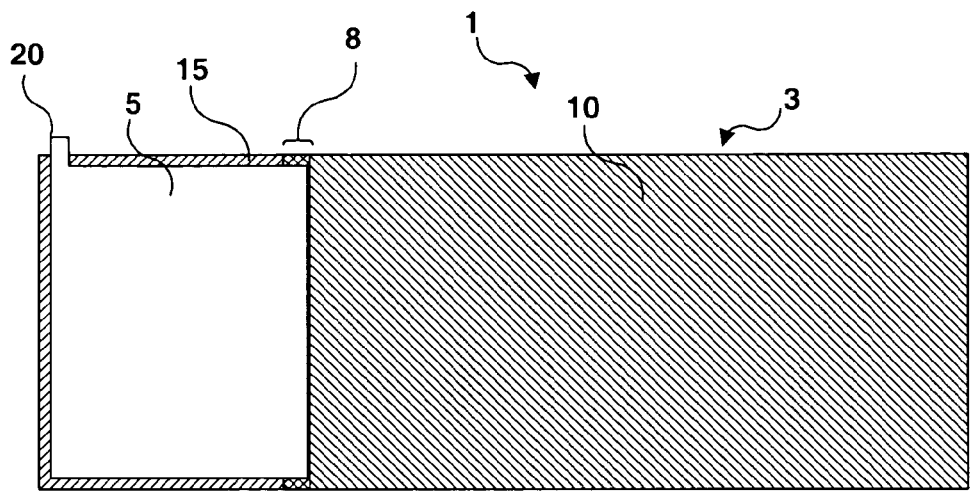
FIGS. 4A through 4C are top plan views of an anode subassembly, showing various arrangements of an alkali metal anode for use in an anode-limited electrochemical cell.

FIG. 4A is a top plan view of the anode subassembly 1 shown in FIG. 3. The anode subassembly 1 includes an anode current collector 5 attached to an alkali metal anode 3 formed from two pieces of anode material, 10 and 15. The anode current collector 5 is a flat piece of conductive metal that is corrosion-resistant when associated with the alkali metal pieces 10 and 15. The anode current collector 5 is preferably fabricated from titanium, nickel, copper or an alloy of nickel or copper. One or more connector tabs 20 may project from anode current collector 5. Anode current collector 5 may be formed with perforations or as a metal grid as is well known in the art. Alternatively, anode current collector 5 may be a solid anode current collector, formed from a solid metal piece, without perforations or openings, as generally disclosed in the related, co-pending U.S. patent application Ser. No. 10/xxx,xxx.

In FIG. 4A, the alkali metal anode 3 is formed from an elongated piece of alkali metal 10 conjoined to a shorter and thinner piece of alkali metal 15. The alkali metal pieces 10 and 15 are preferably foils formed of lithium metal or an alloy of lithium. The two foil pieces 10 and 15 are partially overlapped to provide an interfacing area for forming a cohesive bond between the two pieces 10 and 15. The area of overlap 8 is preferably kept as narrow as possible to avoid excess lithium but still provide a stable cohesive bond. The cohesive bond is formed at the area of overlap 8 using high pressure. The anode current collector 5 may extend over the area of overlap 8 to thereby stabilize and reinforce the cohesive bond between foils 10 and 15.

The anode subassembly 1 shown in FIG. 4A is intended for use in an anode-limited cell wherein the shorter thinner piece of alkali metal 15 forms the outer winding of a coiled electrode assembly formed when anode subassembly 1 is wound around an appropriately-sized mandrel with a cathode subassembly. An anode subassembly including a short, thin piece of alkali metal for forming the outer electrode winding and a long, thicker piece of alkali metal for forming the inner electrode windings is generally disclosed in the above-referenced U.S. U.S. patent application Ser. No. 10/123,495 filed 15 Apr. 2002 and entitled, "Balanced Anode Electrode" invented by Aamodt et al. Such an arrangement has the advantage of achieving a narrow anode material tolerance in an anode-limited cell.

Figure 4B:
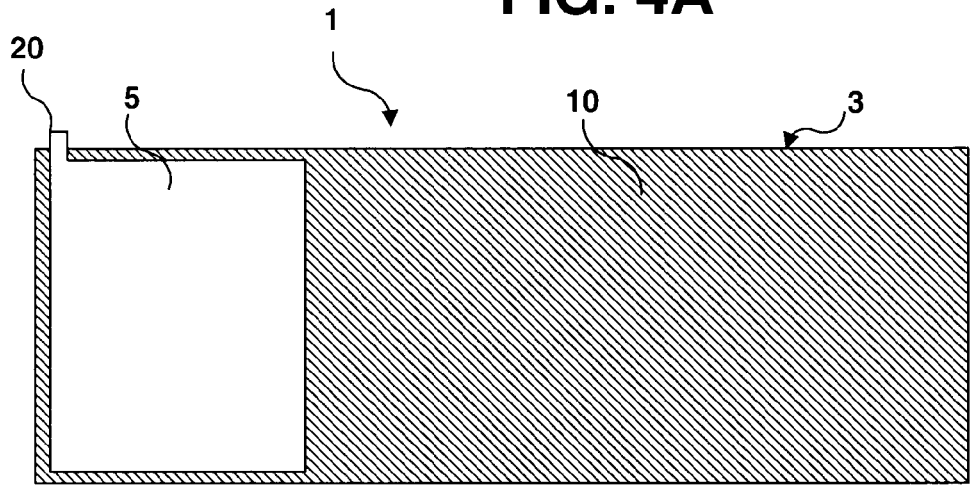
Figure 4C:
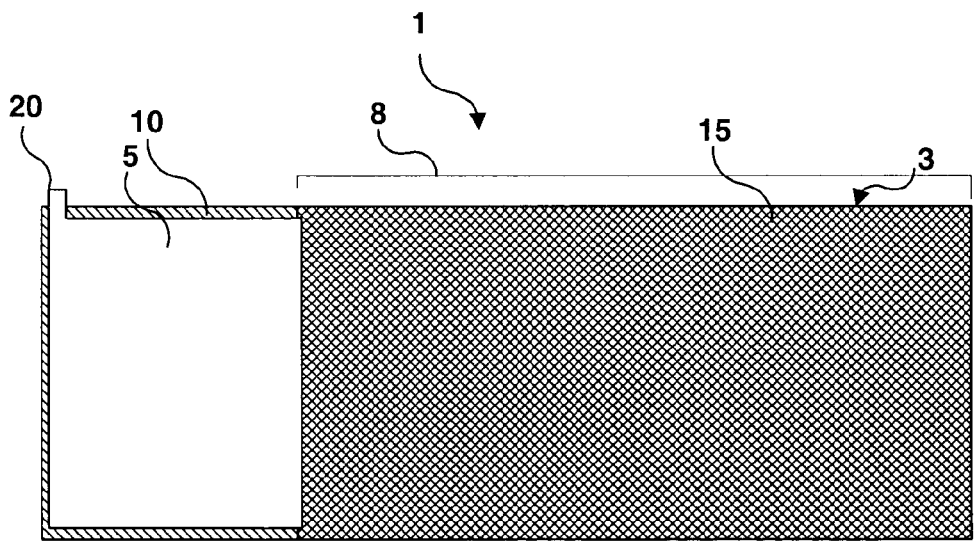

Alternative anode material arrangements may be used within the scope of the present invention for forming the alkali metal anode 3. For example, the anode 3 may be formed from a single elongated piece of alkali foil 10 attached to the solid anode current collector 5 as shown in FIG. 4B, wherein the elongated alkali foil 10 extends the entire length of anode subassembly 1. FIG. 4C illustrates yet another embodiment of an alkali metal anode arrangement. A long foil 10 is cohesively bonded to a shorter alkali metal foil 15 having a length corresponding to the linear distance of the inner coils of a wound electrode assembly. The anode current collector 5 is attached to long foil 10. The area of overlap 8 of the long and short foils 10 and 15 forms the inner coil windings of an electrode assembly, and the long foil 10, with solid current collector 5, forms the outer winding. In this embodiment, the long and short foils 10 and 15 may be provided with the same or different thickness.

In the embodiments of FIGS. 4A, 4B and 4C, the assembly process for producing anode subassembly 1 includes the step of pressing the alkali metal anode 3 onto solid anode current collector 5 to securely attach the anode current collector 5 to the anode material. Pressure of about 800 psi may be used to attach the anode current collector 5 to the anode 3. Anode current collector 5 is preferably pressed onto and thereby securely attached to the anode alkali metal at a location corresponding to the area that will become the outer surface of the outermost winding of a coiled electrode assembly.

The anode subassembly materials, namely anode current collector 5, and alkali metal anode 3, may be positioned as desired in a die which is then placed between the platens of a hydraulic press which presses the anode 3 onto anode current collector 5. Preferably the pressed joint between the anode current collector 5 and the alkali metal anode 3 withstands a pulling force of at least about 0.25 lbs, depending on the materials used, without delaminating such that delamination will not occur during the expected device life.

Figure 5A:
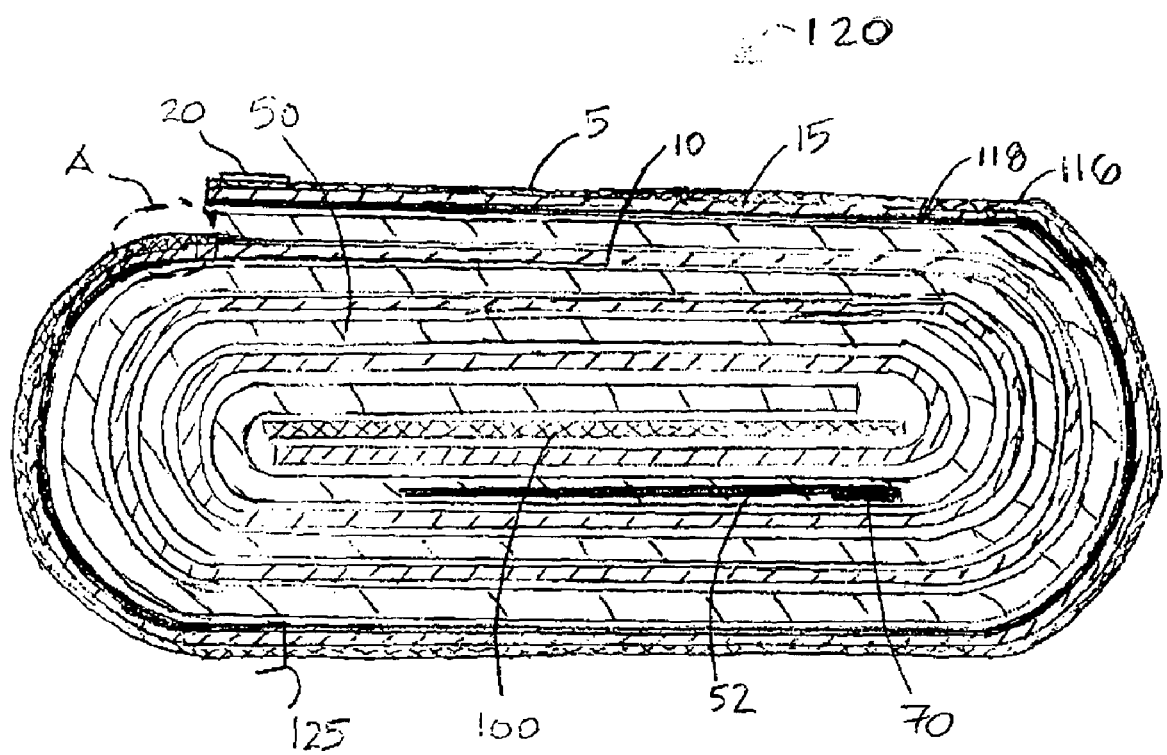
FIG. 5A is an end view of an electrode assembly including the separator subassembly provided by the present invention.

FIG. 5A is an end view of an electrode assembly including the separator subassembly provided by the present invention. Electrode assembly 120 is formed by winding anode subassembly 1, enveloped within separator subassembly 110, with a cathode subassembly around an appropriately sized mandrel 100. The cathode subassembly includes cathode material 50 and a cathode current collector 52. The cathode current collector 52 is formed from a conductive metal that is corrosion resistant at the cathode potential, such as titanium or aluminum. The cathode current collector may be provided with one or more projecting connector tabs 70 to allow connection to a cathode terminal. The cathode material 50 includes a solid reactive cathode ingredient, such as silver vanadium oxide (SVO), and may include other materials such as binding materials or conductivity enhancers as desired.

A method for winding the electrode assembly 120 may be performed as described in previously referenced U.S. Pat. Nos. 5,486,215 or 6,051,038. The length of the anode subassembly 1 relative to the cathode subassembly is such that the outermost winding 125 of the electrode assembly 120 is formed by the anode subassembly 1. When the anode subassembly 1 of FIG. 4A is used, the length of the elongated alkali metal piece 10 and the length of the shorter, thinner alkali metal piece 15 are such that the thicker piece 10 forms the inner windings of the electrode assembly 120 and the thinner piece 15 forms the outermost winding 125 of the assembly 120. Prior to coiling anode and cathode subassemblies together, anode subassembly 1 is sealed within separator subassembly 110. Cathode subassembly may optionally be sealed in a separator, e.g., in a commercially available microporous, single layer or multi-layer film formed from a non-conductive material that is chemically inert in the environment of the electrochemical cell, such as polypropylene and/or polyethylene separator.

After the anode and cathode subassemblies have been properly wound, the mandrel 100 may be removed. The inner windings of the anode subassembly 1 formed by the thicker alkali metal piece 10 face cathode 50 on both sides. The outermost winding 125 formed by the thin alkali metal piece 15 faces cathode 50 only on one side. The spacer 118 included in separator subassembly 110 is positioned on the inner surface of the outermost winding 125, such that it resides adjacent the anode 3 between the cathode 50 and thin alkali metal piece 15 of the anode subassembly 1. Spacer 118 provides a protective layer between the cathode material 50 and the anode current collector 5 when the thin anode alkali foil 15 becomes depleted toward the end of cell discharge, particularly when the separator 116 is relatively thin and subject to tearing when pressed between a cathode crack and anode current collector 5.

Spacer 118 is preferably dimensioned to extend slightly beyond the outer perimeter of anode current collector 5. However, spacer 118 is preferably sized no larger than necessary to provide a protective layer between anode current collector 5 and cathode 50 so as to minimize the volume occupied by spacer 118.

By sealing spacer 118 to separator 116, anode subassembly 1 is free to "float" within separator subassembly 110 during the coiling process. The separator subassembly 110 is thereby subjected to minimal stress during the coiling process.

Figure 5B:
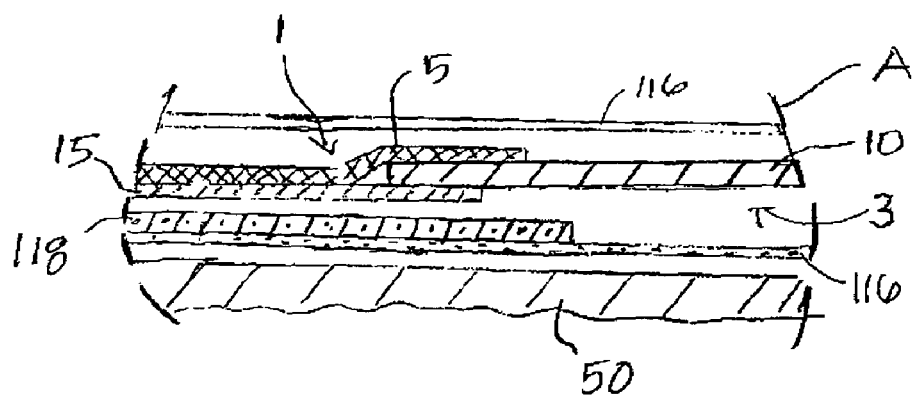
FIG. 5B is an enlarged view of the area indicated by the dashed circle labeled A in FIG. 5B providing a detailed view of the anode subassembly enveloped within the separator subassembly.

FIG. 5B is an enlarged view of the area indicated by the dashed circle labeled A in FIG. 5A, providing a detailed view of anode subassembly 1 enveloped within separator subassembly 110. As described previously, the thick and thin foils 10 and 15 are pressed together with an area of overlap 8. Anode current collector 5 is positioned on the outer side of the alkali metal anode 3 and may extend over the area of overlap 8 between thick and thin foils 10 and 15 to provide reinforcement of the cohesive bond between thick and thin foils 10 and 15.

Anode subassembly 1 "floats" within sealed separator subassembly 110. Separator 116 surrounds anode subassembly 1 on all sides, and spacer 118 is aligned with anode current collector 5 on the opposite, inner side of alkali metal anode 3 from anode current collector 5, on an inner face of separator 116. Spacer 118 provides an added layer of protection between cathode 50 and anode current collector 5. Spacer 118 extends slightly beyond the ends of anode current collector 5.

Assembly of the electrode assembly 120 into an exemplary battery is shown in FIGS. 6 through 8. In FIG. 6, a coil insulator 200 is placed onto the electrode assembly 120. The coil insulator includes a notch 202 to accommodate anode connector tab 20 and slit 206 to accommodate cathode connector tab 70. The electrode assembly 120 is also inserted into an insulating case liner 210. The case liner 210 preferably extends at its top edge above the edge of the electrode assembly 120 in order to provide an overlap with other insulating elements. If so, it may include a notch 211 on one side in order to allow the connection of the anode connector tab 20 to the case 220, for a case negative battery. The coil insulator 200 and case liner 210 are preferably made from a polyolefin polymer or a fluoropolymer such as PTFE or PCTFE. The electrode assembly 120 and case liner 210 are then inserted into a battery case 220, preferably made of stainless steel or titanium. The battery case 220 is shown as a prismatic, deep-drawn case in FIG. 6, however, the electrode assembly 120 may be placed in battery cases that are non-prismatic, e.g., having arcuate geometries, and/or shallow rather than deep.

In FIG. 7 a case cover 230 and a pin insulator 240 are shown along with the electrode assembly 120 and case 220. The case cover 230 has a glassed in feedthrough 232 and feedthrough pin 233 extending through an aperture in the case cover 230 that has a bend 234 which is intended to place the feedthrough 232 in alignment with the cathode connector tab 70. The case cover 230 also has a fill port 236. Later in the battery assembly process, an appropriate electrolyte solution is introduced through the fill port 236, and the fill port 236 is sealed. The electrolyte solution can be an alkali metal salt in an organic solvent such as a lithium salt (i.e., 1.0M $LiClO_4$ or $LiAsF_6$) in a 50/50 mixture of propylene carbonate and dimethoxyethane. The sealing process may include, for example, making a first seal by pressing a plug into the aperture of the fill port 236 and making a second seal by welding a cap or disc over the fill port 236. Material utilized for leak checking hermetic seals may be included between the first and second seals.

The case cover 230 is made from stainless steel, and the feedthrough pin 233 is preferably niobium or molybdenum. The pin insulator 240 has an aperture 242 leading into a raised portion 244 which receives the feedthrough pin 233 and insulates the feedthrough pin 233 from contact with the case cover 230. In combination with one side of the coil insulator 200, which is immediately below the pin insulator 240, the raised portion forms a chamber, which isolates the cathode connection. Additional insulation in the form of tubing or a coating may also be included on the feedthrough pin 233 and feedthrough 232 at locations that will not be welded to further insulate the feedthrough pin 233 and feedthrough 232. An optional cover insulator could be applied to the underside of the case cover 230 to provide additional insulation for the case cover 230.

The feedthrough pin 233 is welded to the cathode connector tab 70 as shown in FIG. 8. The anode connector tab 20 is welded to the side of the case 220 thereby making the metal case 220 one terminal or contact for the battery (i.e. a case negative design). The feedthrough pin 233 is then inserted through a split in the pin insulator 240 until it projects through the aperture 242 of the pin insulator 240. The electrode assembly 120 may be out of the case 220 during some of the welding and bending operations. The case cover 230 is then welded to the case 220 to seal the electrode assembly 120 in the case. The cathode connection is thoroughly isolated from the portions of the battery at anode potential, and the feedthrough connection is thoroughly isolated from stray particles of material from the cathode and from anode particles that may form during discharge of the battery.

Thus, an electrochemical cell has been disclosed having a separator subassembly designed to reduce the potential risk of a short occurring between the cathode and the anode current collector. While the embodiments described herein have been directed toward a lithium-limited cell having a coiled electrode configuration, it is recognized that aspects of the present invention may be beneficially implemented in a other types of cells, either anode- or cathode-limited cells, having a variety electrode configurations. The disclosed embodiments are therefore intended to be exemplary, rather than limiting, with regard to the following claims.

What is claimed is:

1. A separator subassembly for a coiled electrode-type electrochemical cell having an anode and a cathode, comprising:
   an elongated separator layer; and
   means for protecting against a short circuit condition between the anode and the cathode as a material that forms the anode becomes depleted during cell discharge including a spacer layer joined to a portion of the elongated separator layer at a location along the length of the separator layer so that when an anode subassembly is enveloped within the elongated separator layer, the spacer layer aligns with and overlaps a surface-mounted anode current collector of the anode subassembly, and
   wherein the spacer layer covers a single side of the anode subassembly and leaves an inner end of the anode subassembly exposed.

2. A separator subassembly according to claim 1, wherein opposing sides of the elongated separator layer couple together to form a sealed pouch around the anode subassembly.

3. A separator subassembly according to claim 2, wherein the spacer layer is relatively thicker than the separator layer.

4. A separator subassembly according to claim 3, wherein a portion of the separator layer approximately the size of the spacer layer is absent from said separator layer, and further comprising a mechanical or chemical bond disposed along at least a portion of a common periphery region between said separator layer and said spacer layer.

5. A separator subassembly according to claim 1, wherein said separator layer includes a longitudinal indicia or a longitudinal crease for receiving said a relatively thin edge of the anode assembly.

6. A separator subassembly according to claim 5, further comprising an aperture corresponding to an electrical tab member of said anode assembly, said aperture disposed adjacent the spacer layer and in alignment with said longitudinal indicia or said longitudinal crease.

7. A separator subassembly according to claim 1, further comprising at least two spacer layers, each of said at least two discrete spacer layers corresponding to, aligning with, and overlapping, respectively, a one of at least two surface-mounted current collectors coupled to the anode subassembly.

8. A separator subassembly according to claim 1, wherein the anode subassembly further comprises:
   a lithium material; and
   wherein the surface-mounted current collector couples to the lithium material.

9. A separator subassembly according to claim 8, wherein the surface-mounted current collector comprises a one of: a copper material, a nickel material, a titanium material.

10. A separator subassembly according to claim 1, wherein the elongated separator layer comprises
    an elongated, generally rectangular sheet of dielectric separator material, said sheet of dielectric separator material having a portion removed that corresponds in dimension to a surface-mounted current collector of an anode subassembly for a coil-type electrochemical cell; and
    a portion of the spacer layer is bonded in place of the removed portion.

11. A separator subassembly according to claim 10, wherein the portion of spacer layer is disposed along an edge of the sheet of dielectric separator material.

12. A separator subassembly according to claim 11, further comprising an aperture disposed along a longitudinal crease or a longitudinal indicia and adjacent an edge of the portion of spacer material, wherein said aperture is adapted to receive an electrically conducting tab that couples to the surface-mounted current collector.

13. An electrochemical cell having an anode and a cathode coiled together, the cell comprising:

an anode current collector pressed onto the anode along a first surface of the anode along a winding of the anode and cathode coil;

an elongated separator layer folded and sealed to envelope the anode and the anode current collector; and a spacer layer sealed to the separator layer at a position opposite the anode current collector along a second surface of the anode opposite the first surface for protecting against a short circuit condition between the anode current collector and the cathode as the anode becomes depleted during cell discharge;

wherein the spacer layer covers the second surface opposite the current collector and leaves an inner end of the anode and the first surface of the anode exposed.

14. The electrochemical cell of claim 13 wherein the first surface is an outer surface of the anode and the winding is an outermost winding of the coil such that the spacer layer is positioned along an inner surface of the anode along the outermost coil winding, opposite the current collector positioned along the outer surface of the anode along the outermost winding of the coil.

15. The electrochemical cell of claim 13 wherein the separator layer having a longitudinal separator edge, the cell further comprising a seam area extending along the longitudinal separator edge, the spacer layer and the separator layer sealed together along the seam area.

16. The electrochemical cell of claim 15 wherein the spacer layer is disposed along an inner face of the separator, between the anode and the separator.

17. The separator subassembly according to claim 1 wherein the spacer layer is sealed to the separator layer only along a single side of the separator layer.

18. The separator subassembly according to claim 17 wherein the spacer layer is sealed to the separator layer along a seam area extending parallel to a longitudinal separator edge.

19. The separator subassembly according to claim 17 wherein the anode subassembly comprises an anode current collector pressed onto the anode along a first surface of the anode along a winding of the electrode coil, and the spacer layer being sealed to the separator layer at a position along the separator layer corresponding to a position opposite the anode current collector along a second surface of the anode opposite the first surface.

20. The separator subassembly according to claim 19 wherein the first surface being an outer surface of the anode and the winding is an outermost winding of the coil, wherein the spacer layer being positioned along the separator layer at a position corresponding to the second surface, the second surface being an inner surface of the anode along the outermost winding opposite the current collector.

* * * * *